United States Patent
Zhu et al.

(10) Patent No.: US 7,394,500 B2
(45) Date of Patent: Jul. 1, 2008

(54) WORLD WIDE ANALOG TELEVISION SIGNAL RECEIVER

(75) Inventors: Daniel Q. Zhu, Churchville, PA (US); Hulyalkar Samir, Newtown, PA (US); Binning Chen, Newtown, PA (US); Troy Schaffer, Newtown, PA (US)

(73) Assignee: ATI Technologies Inc., Markham, Ontario (CA)

( * ) Notice: Subject to any disclaimer, the term of this patent is extended or adjusted under 35 U.S.C. 154(b) by 507 days.

(21) Appl. No.: 10/940,153

(22) Filed: Sep. 13, 2004

(65) Prior Publication Data

US 2006/0055824 A1 Mar. 16, 2006

(51) Int. Cl.
*H04N 3/27* (2006.01)
(52) U.S. Cl. .................. 348/554; 348/725; 348/555
(58) Field of Classification Search ........... 348/725, 348/726, 554, 555, 731; 455/335, 337, 302, 455/340
See application file for complete search history.

(56) References Cited

U.S. PATENT DOCUMENTS

| | | | | |
|---|---|---|---|---|
| 5,617,060 A * | 4/1997 | Wilson et al. | ............... | 330/129 |
| 5,737,035 A * | 4/1998 | Rotzoll | ............... | 348/725 |
| 5,937,341 A * | 8/1999 | Suominen | ............... | 455/324 |
| 6,005,640 A * | 12/1999 | Strolle et al. | ............... | 348/726 |
| 6,205,325 B1 * | 3/2001 | Groe | ............... | 455/333 |
| 6,233,295 B1 * | 5/2001 | Wang | ............... | 375/364 |
| 6,369,857 B1 * | 4/2002 | Balaban et al. | ............... | 348/555 |
| 6,643,502 B1 * | 11/2003 | Van De Plassche et al. | . | 455/339 |
| 6,725,463 B1 * | 4/2004 | Birleson | ............... | 725/151 |
| 6,985,192 B1 * | 1/2006 | Bouillet et al. | ............... | 348/735 |
| 7,202,910 B1 * | 4/2007 | Grubbs et al. | ............... | 348/555 |
| 2003/0025841 A1 * | 2/2003 | Sawyer | ............... | 348/734 |
| 2004/0061804 A1 * | 4/2004 | Favrat et al. | ............... | 348/554 |
| 2004/0109092 A1 * | 6/2004 | Markman et al. | ............... | 348/726 |
| 2005/0243218 A1 * | 11/2005 | Yee et al. | ............... | 348/725 |

OTHER PUBLICATIONS

Microtune Inc., MT2050 Single-Chip Broadband Tuner Data Sheet, Cable Modem and digital Set-Top Box Application, May 2003.
Analog Devices Inc., ADV7402/ADV7400 Multiformat Video Decoders of Advanced TV, 2003.
Philips Semiconductors, TDA827X Silicon Tuner Family, Jun. 2003, Koninklijke Philips Electronics N.V., Netherlands.
Philips Semiconductors Rennes, TDA8290 Digital Global-Standard Low IF Demodulator for Analog TV Preliminary Datasheet, Revision 0.8, Aug. 2003.
Philips Semiconductors, SAA7114 PAL/NTSC/SECAM Video Decoder with Adaptive PAL/NTSC Comb Filter, VBI Data Slicer and High Performance Scaler, Product Specification Mar. 2004, Koninklijke Philips Electronics N.V., Netherlands.

* cited by examiner

*Primary Examiner*—Victor R. Kostak
(74) *Attorney, Agent, or Firm*—Vedder Price P.C.

(57) ABSTRACT

A TV signal reception system is configured to include adjustable components and a controller to provide instructions to adjust the adjustable components. By pre-arranging configurations corresponding to multiple variants of world wide TV standards, the TV signal reception system may avoid the hardware costs of accomplishing the reception of multiple standards of with parallel hardware for each standard and/or variant.

20 Claims, 10 Drawing Sheets

| | M | M | N | B | B1 | G | H | I | D | D1 | K | K1 | L |
|---|---|---|---|---|---|---|---|---|---|---|---|---|---|
| VIDEO CODING | NTSC/PAL | NTSC-4.43 | PAL | PAL/SECAM | PAL | PAL/SECAM | PAL | PAL | PAL/SECAM | PAL | PAL/SECAM | PAL/SECAM | SECAM |
| CHAN BW | 6 | 6 | 6 | 7 | 8 | 8 | 8 | 8 | 8 | 8 | 8 | 8 | 8 |
| VIDEO BW | 4.2 | 4.2 | 4.2 | 5 | 5 | 5 | 5 | 5.5 | 6 | 5 | 6 | 6 | 6 |
| VSB PREFILTERING | 0.75 | 0.75 | 0.75 | 0.75 | 0.75 | 0.75 | 1.25 | 1.25 | 0.75 | 0.75 | 0.75 | 1.25 | 1.25 |
| IF | 44 | 44 | 44 | 36.65/ 34.63 | 36.15 | 36.15 | 36.15 | 36.15/ 36.75 | 36.15/ 35.25/ 34.25 | 36.15 | 36.15/ 35.25/ 34.25 | 35.45/ 37.45 | 36.15/ 35.45 |
| VIF | 45.75 | 45.75 | 45.75 | 38.9/ 36.875 | 38.9 | 38.9 | 38.9 | 38.9/ 39.5 | 38.9/ 38/ 37 | 38.9 | 38.9/ 38/ 37 | 32.7/ 40.2 | 38.9/ 32.7 |
| SIF | 41.25 | 41.25 | 41.25 | 33.4/ 31.38 | 33.4 | 33.4 | 33.4 | 32.9/ 33.5 | 32.4/ 31.5/ 30.5 | 32.4 | 32.4/ 31.5/ 30.5 | 39.2/ 33.7 | 32.4/ 39.2 |

| IF | 44 | 36.15 | 36.65 | 35.25 | 34.25 | 34.625 | 36.75 | 37.45 | AVERAGE |
|---|---|---|---|---|---|---|---|---|---|
| CHANNEL BW | 6 | 8 | 7 | 8 | 8 | 7 | 8 | 8 | |
| BW FOR SAW FILTER 204 | 6 | 8 | 7 | 8 | 8 | 7 | 8 | 8 | |
| SAMPLING FREQ HI | 32150000 | 32150000 | 31450000 | 31250000 | 30250000 | 31125000 | 32750000 | 33450000 | 30250000 |
| SAMPLING FREQ LO | 26766667 | 26766667 | 26300000 | 26166667 | 25500000 | 25416667 | 27166667 | 27633333 | 27633333 |
| BEST FREQ. FOR CRYSTAL OSC. 207 | | | | | | | | | 28941666.5 |

FIG. 3B (300B)

| IF | 44 | 36.15 | 36.65 | 35.25 | 34.25 | 34.625 | 36.75 | AVERAGE |
|---|---|---|---|---|---|---|---|---|
| CHANNEL BW | 6 | 8 | 7 | 8 | 8 | 7 | 8 | |
| BW FOR SAW FILTER 204 | 8 | 8 | 8 | 8 | 8 | 7 | 8 | |
| SAMPLING FREQ HI | 32150000 | 32150000 | 31450000 | 31250000 | 30250000 | 31125000 | 32750000 | 27333333 |
| SAMPLING FREQ LO | 26766667 | 26766667 | 26300000 | 26166667 | 25500000 | 25416667 | 27166667 | 27166667 |
| BEST FREQ. FOR CRYSTAL OSC. 207 | | | | | | | | 27250000 |

FIG. 4

| IF | 44 | 36.15 | 36.65 | 35.25 | 34.25 | 34.625 | 36.75 | MHZ |
|---|---|---|---|---|---|---|---|---|
| CHANNEL BW | 6 | 8 | 7 | 8 | 8 | 7 | 8 | MHZ |
| FIRST DC FREQ. SOURCE 412 | -10.5 | 8.9 | 9.4 | 8.0 | 7.0 | 7.375 | 9.5 | MHZ |
| SECOND DC FREQ. SOURCE 414 | 1.75 | 2.75 | 2.25 | 2.75 | 2.75 | 2.25 | 2.75 | MHZ |

| IF | 44 | 36.15 | 36.65 | 35.25 | 34.25 | 34.625 | 36.75 | MHZ |
|---|---|---|---|---|---|---|---|---|
| CHANNEL BW | 6 | 8 | 7 | 8 | 8 | 7 | 8 | MHZ |
| FIRST AV SEPARATION FREQ. SOURCE 712 | -0.84(M, N) | -1.84(B, G, H) -2.34(I) -2.84(D, K, L) | -1.84(B) | -1.84(B, G, H) -2.34(I) -2.84(D, K, L) | -1.84(B, G, H) -2.34(I) -2.84(D, K, L) | -1.84(B) | -1.84(B, G, H) -2.34(I) -2.84(D, K, L) | MHZ |
| SECOND AV SEPARATION FREQUENCY SOURCE 714 | 0.84(M, N) | 1.84(B, G, H) 2.34(I) 2.84(D, K, L) | 1.84(B) | 1.84(B, G, H) 2.34(I) 2.84(D, K, L) | 1.84(B, G, H) 2.34(I) 2.84(D, K, L) | 1.84(B) | 1.84(B, G, H) 2.34(I) 2.84(D, K, L) | MHZ |

WORLD WIDE ANALOG TELEVISION SIGNAL RECEIVER

FIELD OF THE INVENTION

The present invention relates to digital processing of analog television signals and, more particularly, to a flexible analog television signal receiver capable of adjustment to receive signals adhering to a wide variety of world standards.

BACKGROUND

There are three major analog television (TV) transmission standards in the world, namely the National Television System Committee (NTSC) standard, the Phase Alternation Line (PAL) standard and the Sequential Color with Memory (SECAM) standard. In addition, there are many local variants for each of these standards. Traditionally, each variant of each standard is associated with a corresponding design for a receiver. A TV manufacturer wishing to build a TV for use with a variety of variants of standards may, for instance, include a different receiver for receiving signals formatted according to each standard. The consequential hardware cost and complexity may be seen as a disincentive for building and marketing such a TV.

Clearly, a receiver architecture that reduces hardware cost and complexity while being flexible enough to receive analog TV signals adhering to a wide variety of variants of standards is desired.

SUMMARY

A receiver of analog TV signals has sufficiently variable and programmable components that the receiver may be arranged to receive analog TV signals adhering to any of a wide variety of world wide standards.

In accordance with an aspect of the present invention there is provided a television signal reception system. The television signal reception system includes an analog to digital converter, a controller and a down converter. The analog to digital converter is for receiving an intermediate frequency television signal and sampling the intermediate frequency television signal at a predetermined sampling frequency to produce a digitized television signal with a center frequency having an expected frequency offset from baseband, where the expected frequency offset is dependent upon a television standard of the intermediate frequency television signal. The controller is for providing an indication of the television standard for the intermediate frequency television signal. The down converter includes a first down converter frequency source for receiving the indication of the television standard from the controller and selecting a frequency for a first mixing signal based on the indication of the television standard, where the frequency for the first mixing signal incorporates the expected frequency offset. The down converter further includes a first down converter mixer for receiving the digitized television signal, receiving the first mixing signal and mixing down the digitized television signal with the first mixing signal to produce a mixed-down, digitized television signal with a center frequency near baseband. The down converter also includes an image rejection filter for receiving the mixed-down, digitized television signal, receiving the indication of the television standard, selecting filter coefficients based on the indication of the television standard and filtering the mixed-down, digitized television signal according to the filter coefficients to produce a filtered digitized television signal.

In accordance with an aspect of the present invention there is provided a television signal reception method. The television signal reception method includes sampling a received intermediate frequency television signal at a predetermined sampling frequency to produce a digitized television signal with a center frequency having an expected frequency offset from baseband, where the expected frequency offset is dependent upon a television standard of the received intermediate frequency television signal, receiving an indication of the television standard, selecting a frequency for a first mixing signal based on the indication of the television standard, where the frequency for the first mixing signal incorporates the expected frequency offset, mixing down the digitized television signal with the first mixing signal to produce a mixed-down, digitized television signal with a center frequency near baseband, selecting filter coefficients based on the indication of the television standard and filtering the mixed-down, digitized television signal according to the filter coefficients to produce a filtered digitized television signal.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
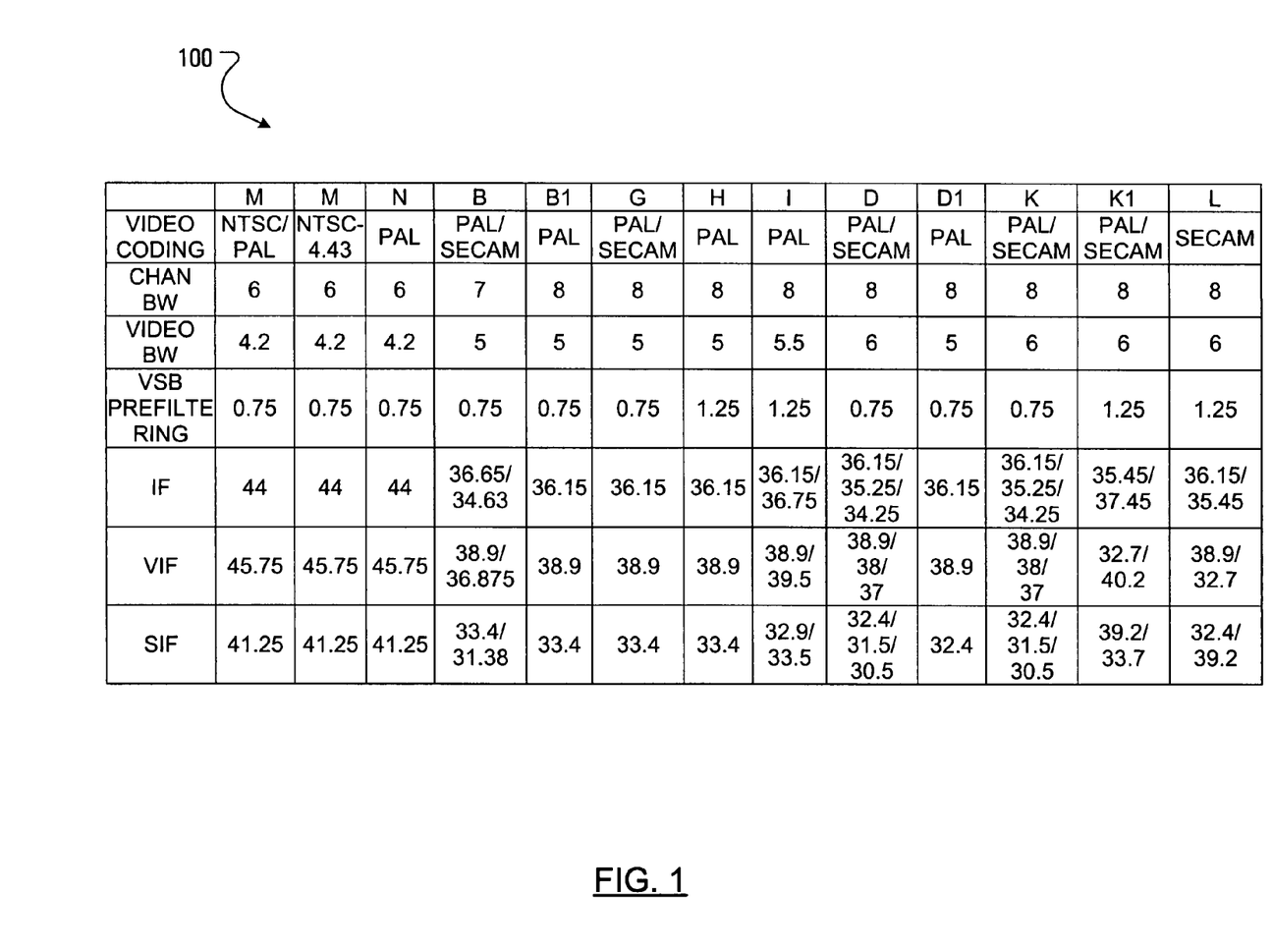
FIG. 1 illustrates a table summarizing the characterizing parameters of international television standards.

The International Telecommunication Union (ITU) has published a complete set of TV standards used worldwide. A summary of these standards is illustrated in FIG. 1.

Figure 2:
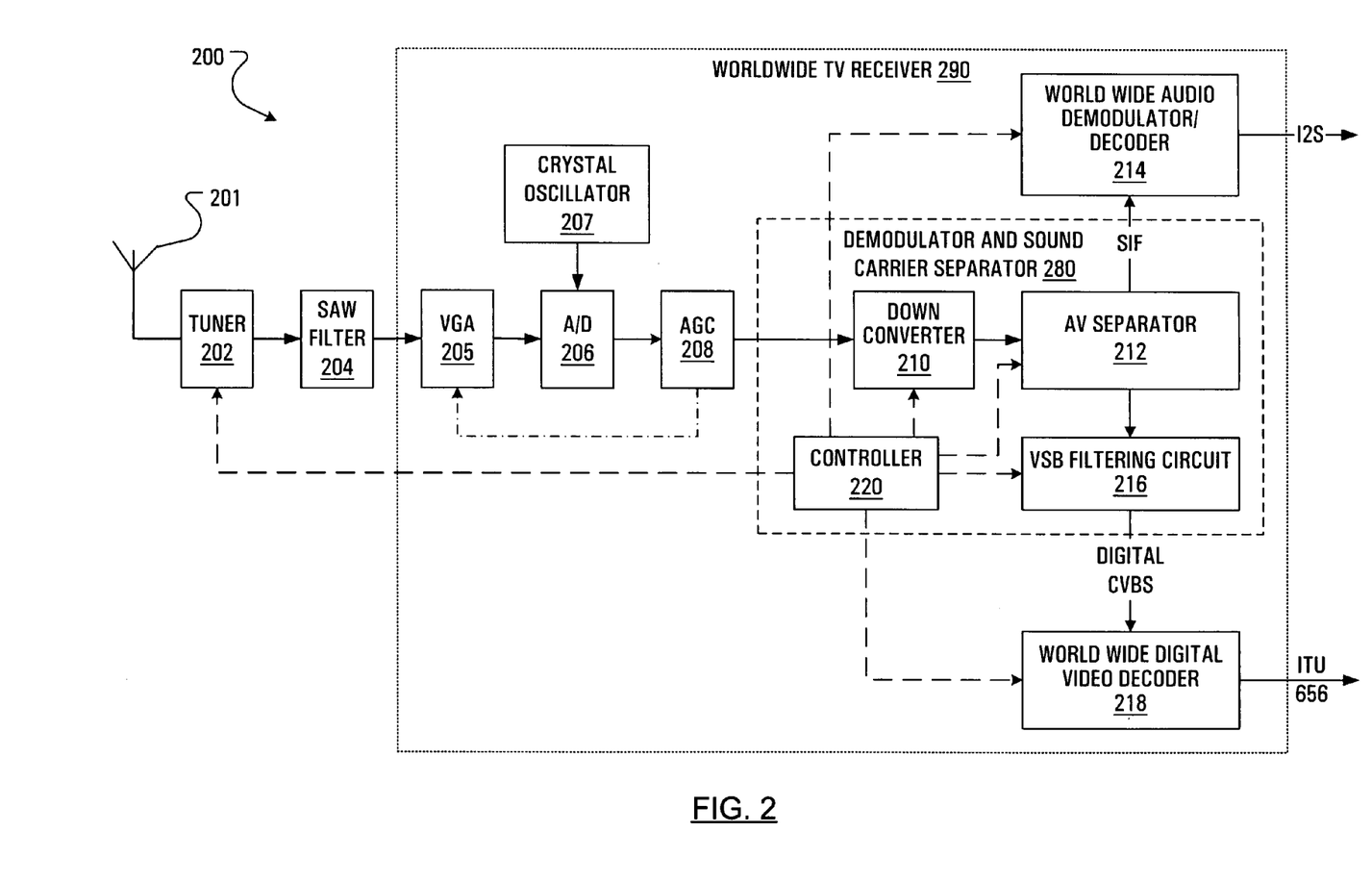
FIG. 2 illustrates a TV signal reception system according to an embodiment of the present invention.

FIG. 2 illustrates a TV signal reception system 200 for use, for example, in a TV set, in a set-top box application, in a video card for a computer (including desktop, laptop and palmtop), in a mobile phone, etc. A standard TV antenna 201 connects to a tuner 202. The output of the tuner 202 is received by a surface acoustic wave (SAW) filter 204. The TV signal at the output of the SAW filter 204 is then received by a world wide TV receiver 290. The world wide TV receiver 290 receives the output of the SAW filter 204 at a Variable Gain Amplifier (VGA) 205, the output of which is received by an analog-to-digital (A/D) converter 206.

The A/D converter 206 has been implemented as the well-known sample-and-hold type but, as will be appreciated by a person skilled in the art, other types of A/D converters may be used here equally. The A/D converter 206 may operate in a bandpass sampling mode with a sampling frequency dependent upon a signal received from a crystal oscillator 207. The bandpass sampling of the A/D converter 206 allows the use of a lower sampling clock while satisfying Nyquist sampling requirement without TV spectrum aliasing when digitizing the desired TV channel.

A digital automatic gain controller (AGC) 208 receives the output of the A/D converter 206. A down converter 210, whose structure will be described in detail in the following, receives the output of the AGC 208 and passes down converted output to an audio/video (AV) separator 212.

The AV separator 212 produces two outputs: a digital sound signal, which may also be referred to as a digital "sound IF" (SIF); and a digital video signal. The digital SIF is received by a world wide audio demodulator/decoder 214. The digital video signal is received by a Vestigial Sideband (VSB) filtering circuit 216 whose output, a Composite Video Baseband Signal (CVBS), is passed to a world wide digital video decoder 218.

Many of the components of the TV signal reception system 200 of FIG. 2 are adjustable to suit particular variations of international TV standards. To maintain control over the adjustable components, the TV signal reception system 200 is provided with a controller 220. The adjustable components that receive input from the controller 220 may include: the tuner 202; the down converter 210; the AV separator 212; the world wide audio demodulator/decoder 214; the VSB filtering circuit 216; and the world wide digital video decoder 218.

Figure 4:
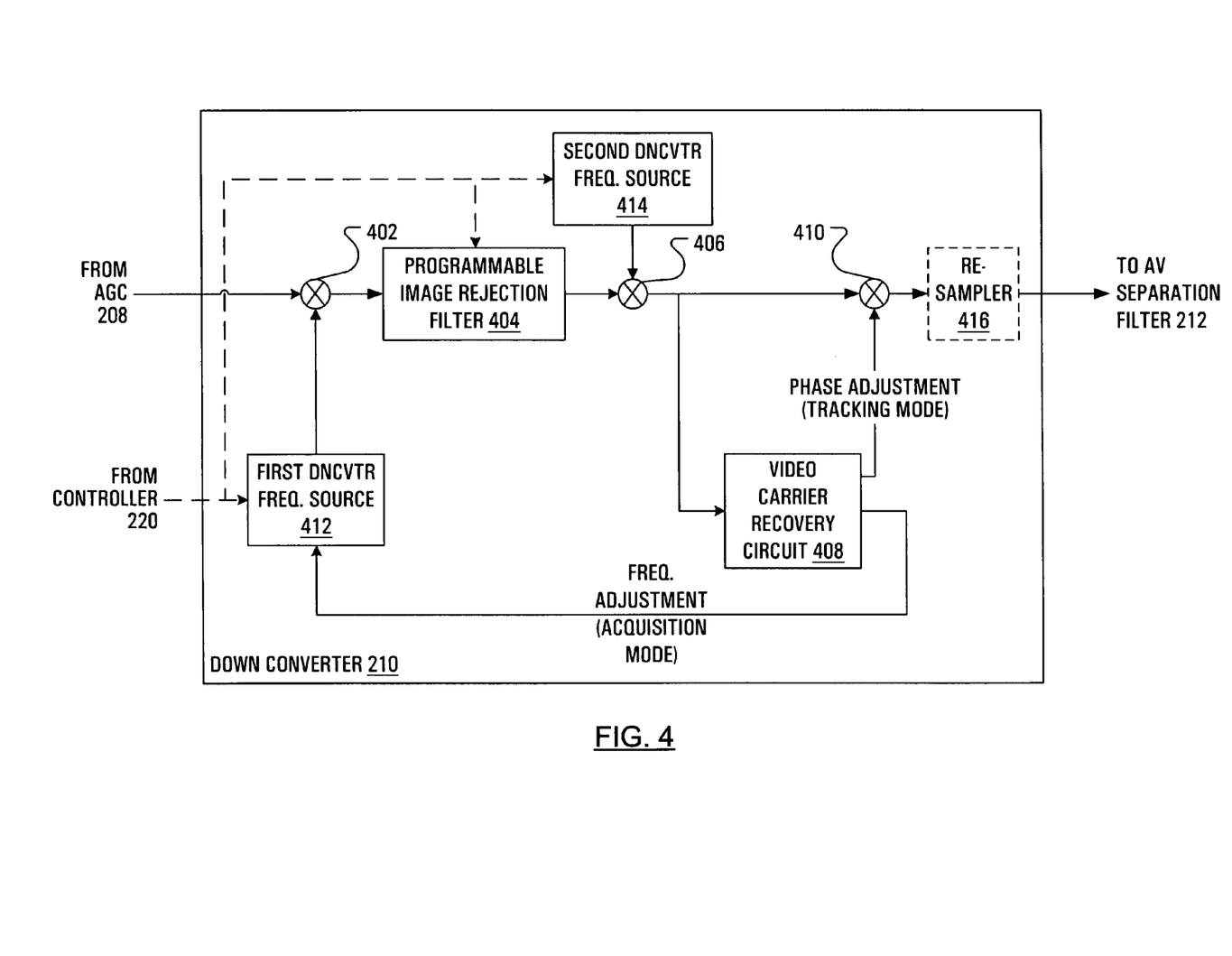
FIG. 4 illustrates a down converter for use in the TV signal reception system of FIG. 2, according to an embodiment of the present invention.

An exemplary design for the down converter 210 is illustrated in FIG. 4. The signal received at the down converter 210 is mixed with a mixing signal from a first down converter (DC) frequency source 412 at a first down converter mixer 402 before being passed to a programmable image rejection filter 404. The output signal of the programmable image rejection filter 404 is received at a second down converter mixer 406 where the output signal is mixed with a mixing signal from a second DC frequency source 414. The output of the second down converter mixer 406 is received at a video carrier recovery circuit 408. The video carrier recovery circuit 408 provides two outputs: a phase adjustment signal and a frequency adjustment signal. The purpose of these adjustment signals will be described later. The frequency adjustment signal is received at the first DC frequency source 412 and used in the signal that is provided to the first down converter mixer 402. The phase adjustment signal is received at a third down converter mixer 410 where the phase adjustment signal is used to modify the output of the second down converter mixer 406, which is also received at the third down converter mixer 410. The output of the third down converter mixer 410, which may be the output of the down converter 210, is passed to the AV separator 212. Optionally, output of the third down converter mixer 410 is passed to a re-sampler 416, output of which may be considered the output of the down converter 210. The re-sampler 416 may allow for a reduced signal processing rate at downstream components.

Adjustable components of the down converter 210 include the first down converter frequency source 412, the second down converter frequency source 414 and the programmable image rejection filter 404. Each of these adjustable components receive, from the controller 220, an indication of the variant of TV standard for which the TV signal reception system 200 is to be configured. According to the indication received from the controller 220, the first down converter frequency source 412 and the second down converter frequency source 414 select a predetermined frequency (given in a table 500 in FIG. 5) and the programmable image rejection filter 404 selects a predetermined set of filter coefficients.

Figure 6:
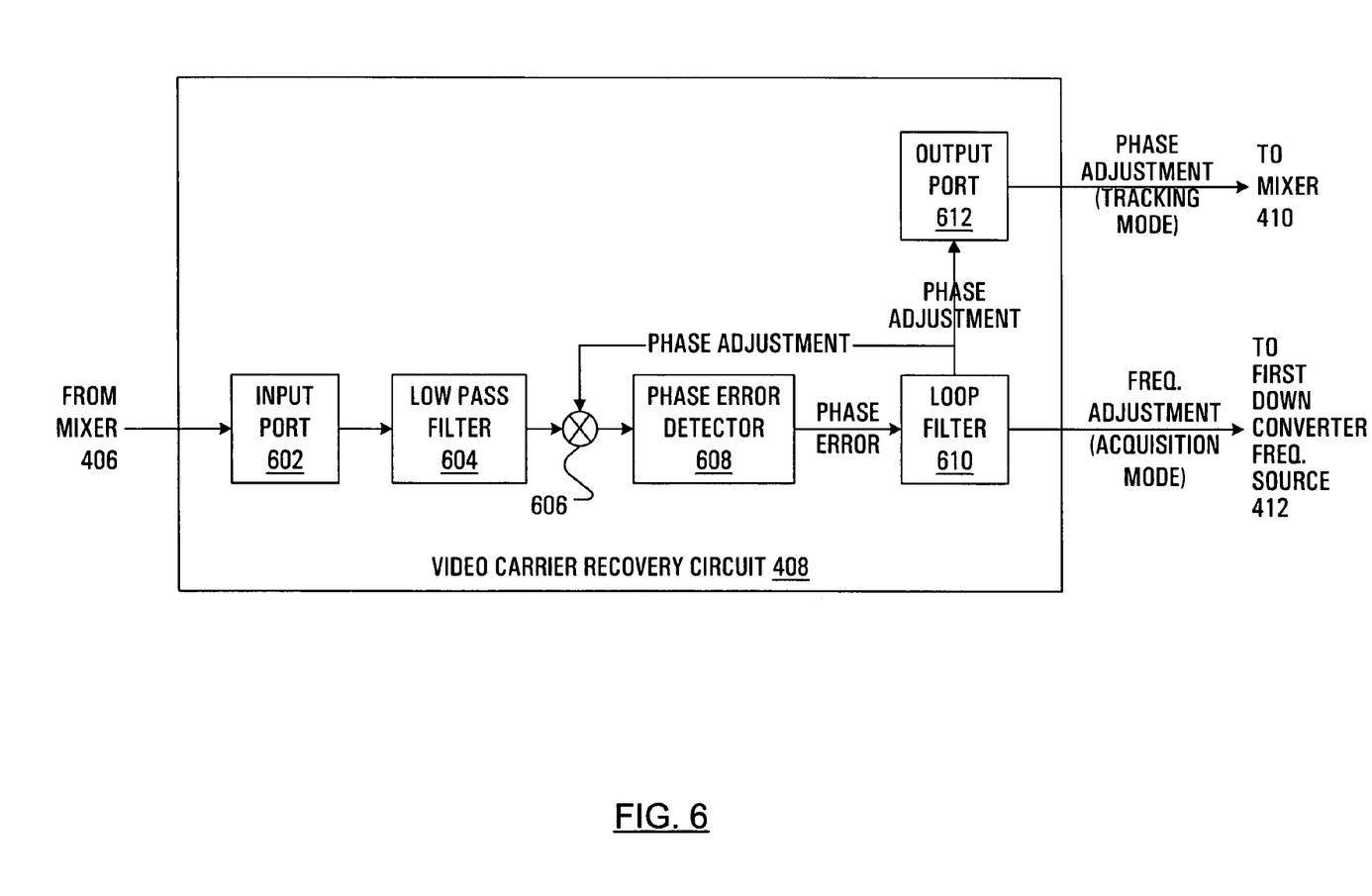
FIG. 6 illustrates a video carrier recovery circuit for use in the down converter of FIG. 4, according to an embodiment of the present invention.

The video carrier recovery circuit 408 is illustrated in more detail in FIG. 6. The signal from the second down converter mixer 406 is received at an input port 602 of the video carrier recovery circuit 408. The signal received at the input port 602 is passed to a low pass filter 604. The output of the low pass filter 604, which may, for instance, pass frequencies from 0 to 500 KHz, is passed to a phase error detector 608 via a video carrier recovery mixer 606. A phase error output from the phase error detector 608 is then received by a loop filter 610. The loop filter 610 produces the frequency adjustment signal for sending to the first DC frequency source 412 (for gross frequency offset control) and the phase adjustment signal for sending to the third down converter mixer 410 via a video carrier recovery output port 612 (for phase error control, which may be considered, over time, to be analogous to fine frequency offset control). The phase adjustment signal is also sent to the video carrier recovery mixer 606 so that the signal received at the phase error detector 608 is representative of the (phase adjusted) signal output from the down converter 210.

The operation of the video carrier recovery circuit 208 may be considered analogous to the operation of a conventional phase locked loop, including the phase error detector 608, the loop filter 610 and a phase-controllable signal source, wherein the combination of the input port 602, the low pass filter 604, the video carrier recovery mixer 606 and the third down converter mixer 410 may be considered the phase-controllable signal source.

Figure 7:
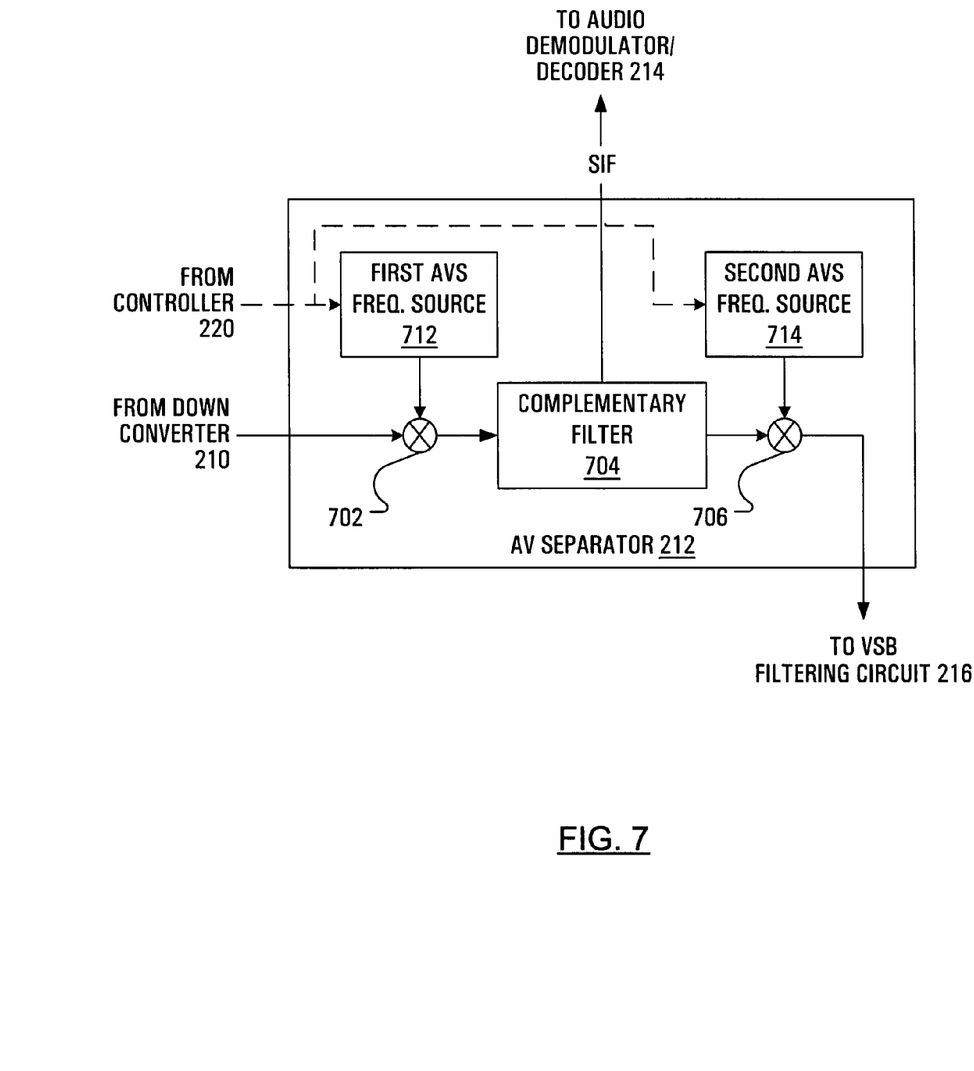
FIG. 7 illustrates an audio/video separator for use in the TV signal reception system of FIG. 2, according to an embodiment of the present invention.

An exemplary design for the AV separator 212 is illustrated in FIG. 7. The signal received at the AV separator 212 from the down converter 210 is mixed with a signal from a first AV separation (AVS) frequency source 712 at a first AV separation mixer 702 before being passed to a complementary filter 704. One output signal of the complementary filter 704 is received at a second AV separator mixer 706 whereat the received output signal is mixed with a signal from a second AV separator frequency source 714. The output of the second down converter mixer 706 is sent to the VSB filtering circuit 216. Another output signal from the complementary filter 704 (the digital SIF) is sent to the world wide audio demodulator/decoder 214.

Adjustable components of the AV separator 212 include the first AV separator frequency source 712, the second AV separator frequency source 714 and the complementary filter 704. Each of these adjustable components receive, from the controller 220, an indication of the variant of TV standard for which the TV signal reception system 200 is to be configured. According to the indication received from the controller 220, the first AV separator frequency source 712 and the second AV separator frequency source 714 select a predetermined frequency (given in a table 800 in FIG. 8) and the complementary filter 704 selects a predetermined set of filter coefficients.

Figure 9:
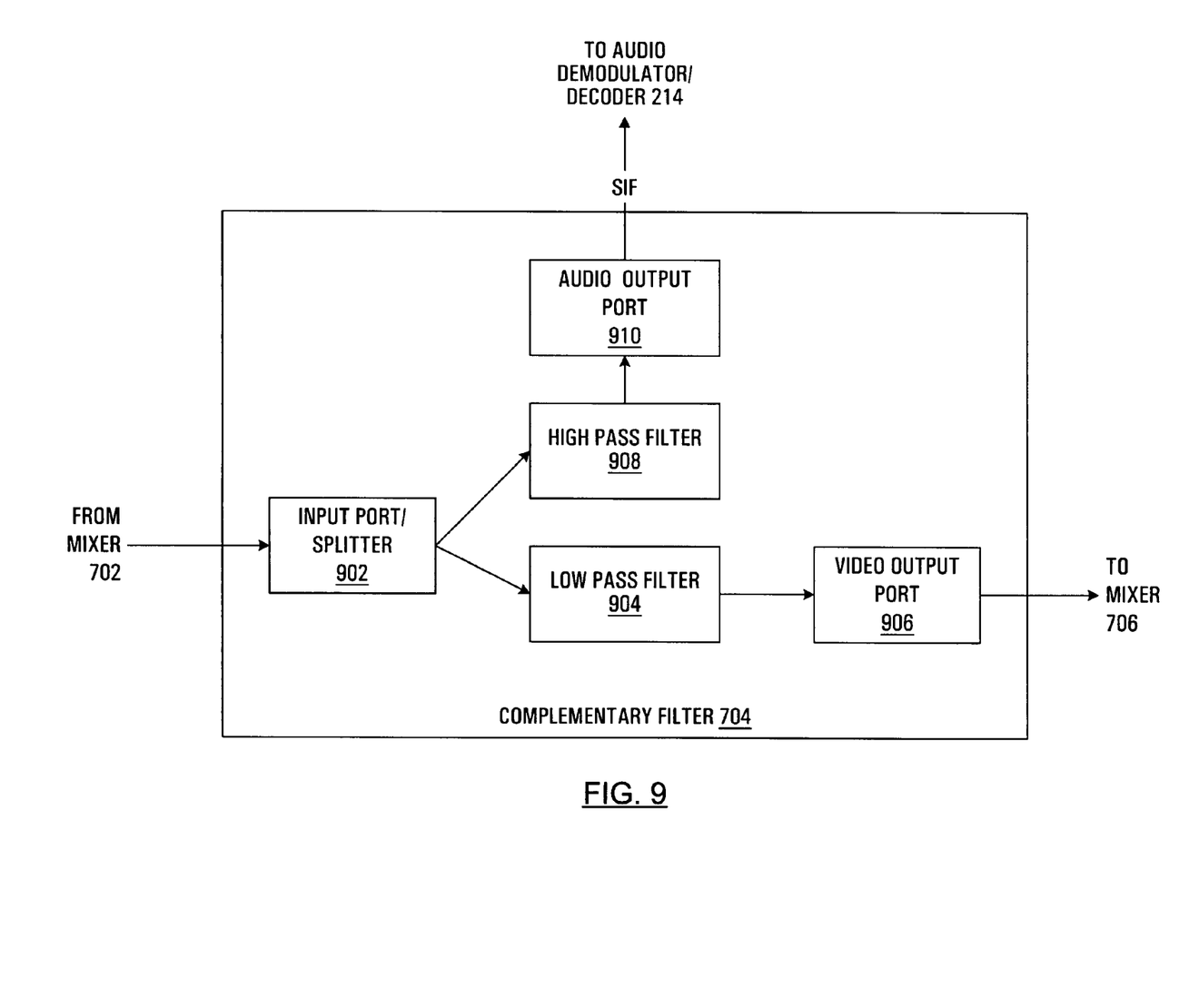
FIG. 9 illustrates a complementary filter for use in the audio/video separator of FIG. 7 according to an embodiment of the present invention.

An optimized, complementary, finite impulse response (FIR) digital filter may be used for the complementary filter 704. As illustrated in FIG. 9, the input to the complementary filter 704 is received at a complementary filter input port/splitter 902 and split into two signal paths. The input signal on a first (lower in FIG. 9) signal path is subjected to a low pass filter 904 with a cut-off frequency configured based on the selection of a sampling frequency for the A/D converter 206. The input signal on a second (upper in FIG. 9) signal path is subjected to a high pass filter 908 that is complementary to the low pass filter 904 (i.e., the cut-off frequency of the low pass filter 904 and the high pass filter 908 are identical) and passed the audio signal components of the input signal to an audio output port 910.

Figure 10:
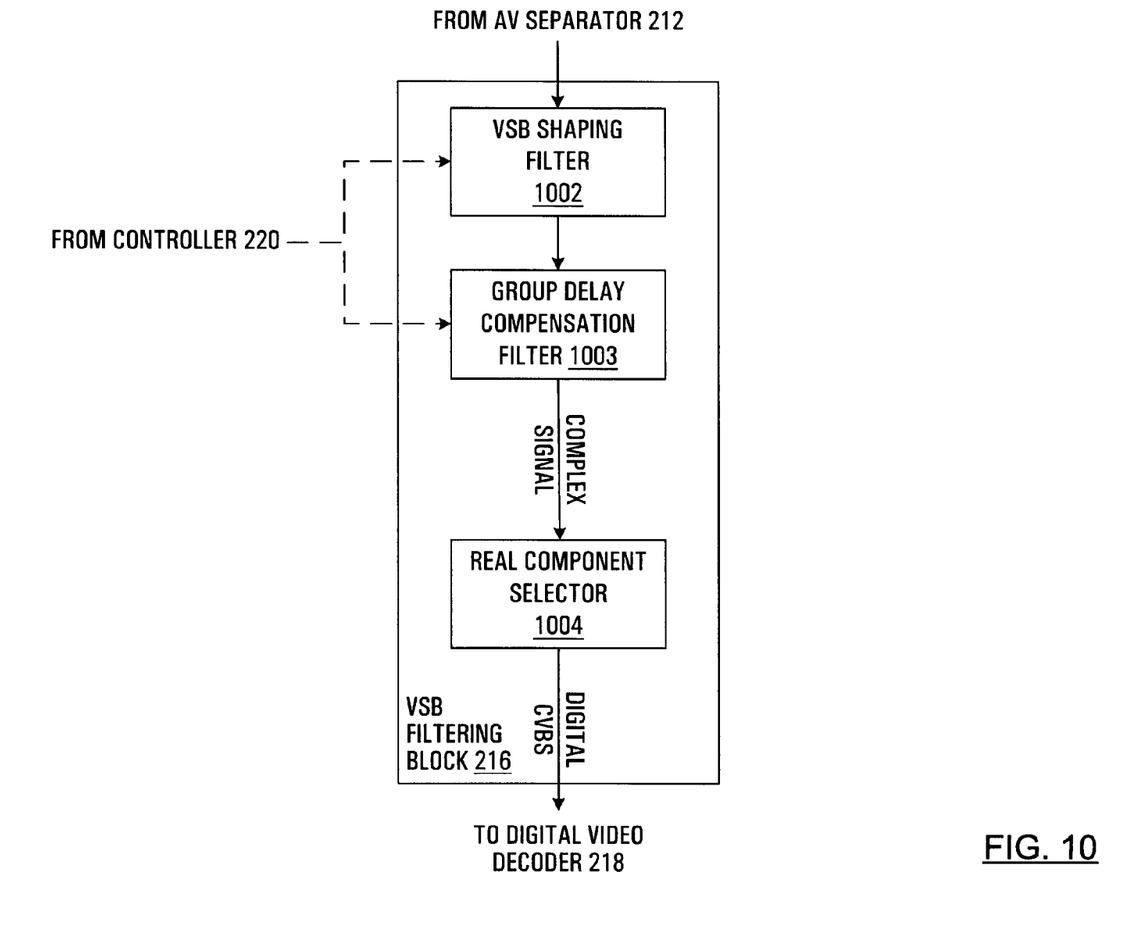
FIG. 10 illustrates a vestigial sideband filtering circuit for use in the TV signal reception system of FIG. 2, according to an embodiment of the present invention.

An exemplary design for the VSB filtering circuit 216 is illustrated in FIG. 10 to include a VSB shaping filter 1002 that receives the input to the VSB filtering circuit 216 and passes a filtered output to a group delay compensation filter 1003. A complex output signal from the group delay compensation filter 1003 is then received by a real component selector 1004. The real-valued output from the real component selector 1004 is then the output of the VSB filtering circuit 216, which output is the digital CVBS received by the world wide digital video decoder 218 (see FIG. 2). The VSB shaping filter 1002 and the group delay compensation filter 1003 receive an indication from the controller 220 of the variant of TV standard used by the signal to be received.

In operation, the antenna 201 receives a broad spectrum of electromagnetic radiation and passes an electrical signal representative of that radiation to the tuner 202. The tuner 202 tunes to a specific frequency range, i.e., a TV channel, in the radio frequency (RF) part of the electromagnetic radiation spectrum. In particular, the tuner 202 tunes to an analog TV channel having a bandwidth of either 6, 7 or 8 MHz according to instructions received from the controller 220. The result of such tuning is a frequency shift of the RF TV signal to an intermediate frequency (IF) TV signal. The IF TV signal is typically around 36 MHz for PAL/SECAM and typically around 44 MHz for NTSC. The IF TV signal is then filtered by the SAW filter 204 to reject adjacent channel interference. The optional SAW filter 204 may be permanently installed as a SAW filter with an 8 MHz bandwidth to pass analog TV channels adhering to a wide variety of standards. Alternatively, a slot may be designed to receive a selected SAW filter 204, so that a user may elect to install a SAW filter with a bandwidth set to 6, 7 or 8 MHz to pass analog TV channels adhering to the TV standard of the signal to be received.

The filtered IF TV signal is then amplified by the VGA 205 according to feedback received from the digital AGC 206.

The amplified and filtered IF TV signal is then digitized by the A/D converter 206 to result in a digitized TV signal. The sampling frequency of the A/D converter 206 is based on a sampling signal received from the crystal oscillator 207, where the frequency of the sampling signal is selected to eliminate spectral aliasing after bandpass sub-sampling across the entire range of variants of standards for which the TV signal reception system 200 may be required to work.

Figure 3A:
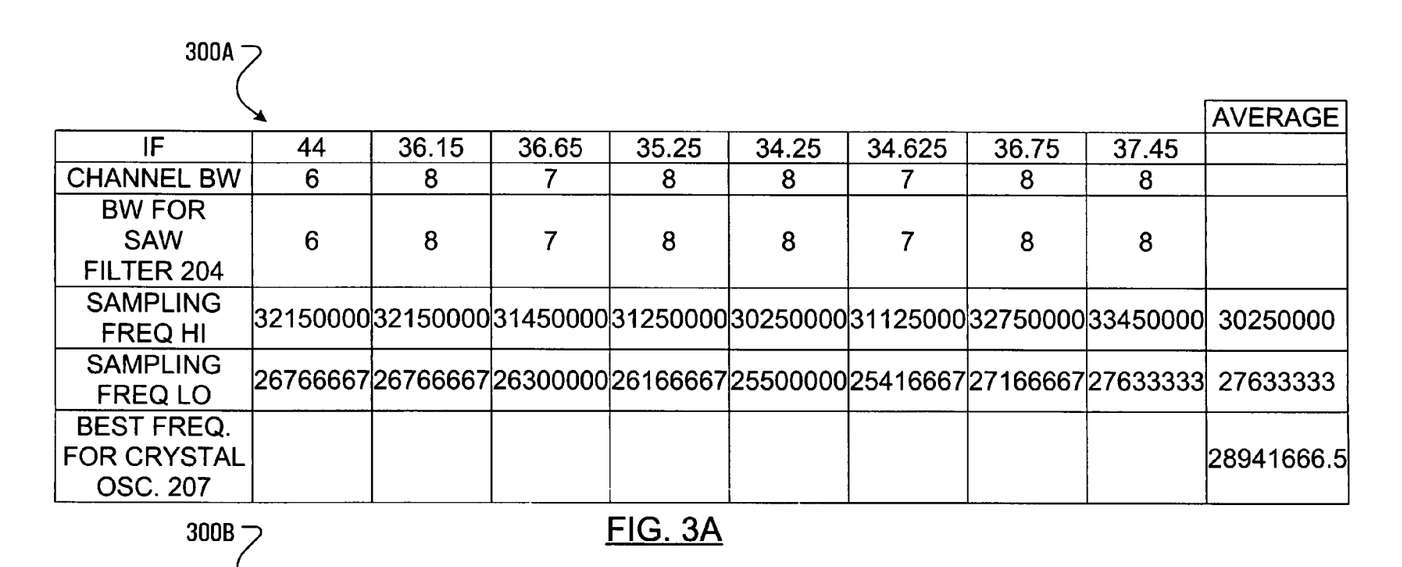
FIG. 3A illustrates a first table summarizing ranges of sampling frequencies for use in the TV signal reception system of FIG. 2.

A skilled person configuring the TV signal reception system 200 selects a preferred sampling frequency for the A/D converter 206 and, therefore, a frequency of crystal to use in the crystal oscillator 207. A first table 300A in FIG. 3 summarizes a range (from sampling freq. lo to sampling freq. hi) of sampling frequencies available for each of a selected number of TV standards and variations as characterized by IF and channel bandwidth parameters where the SAW filter 204 is adjustable. An average value is indicated for each of sampling freq. lo and sampling freq. hi and the mid point value of the two average values is indicated for the first table 300A. From the first table 300A, the skilled person configuring the TV signal reception system 200 may select a sampling frequency, $f_s$, of 28.94 MHz.

Figure 3B:
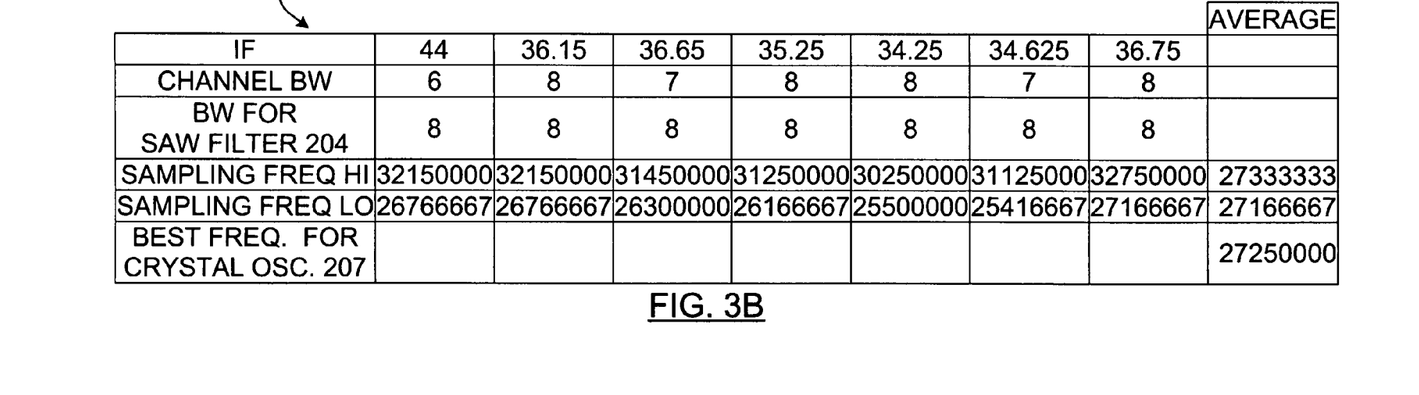
FIG. 3B illustrates a second table summarizing ranges of sampling frequencies for use in the TV signal reception system of FIG. 2.

A second table 300B in FIG. 3B summarizes a range (from sampling freq. lo to sampling freq. hi) of sampling frequencies available for each of a selected number of TV standards and variations as characterized by IF and channel bandwidth parameters where the SAW filter 204 is fixed at 8 MHz. An average value is indicated for each of sampling freq. lo and sampling freq. hi and the mid point value of the two average values is indicated for the second table 300B. From the second table 300B, the skilled person configuring the TV signal reception system 200 may select a sampling frequency, $f_s$, of 27.25 MHz.

The digitized TV signal output from the A/D converter 206 is received by the digital AGC 208, which monitors the output from the A/D converter 206 and may transmit a feedback signal to the VGA 205 to adjust the level of the signal input to the A/D converter 206 to optimize operation of the A/D converter 206 for the particular TV channel being tuned. Thus, the digital AGC 208 may be used to counter some of the effects of adjacent channel interference. Assuming a desired channel is channel 6, it may be that the signals at channels 5 and 7 are very strong. Despite the SAW filter 204, and especially where the SAW filter 204 has a fixed bandwidth of 8 MHz, adjacent channel interference signals from channels 5 and 7 may be received at the A/D converter 206. If the adjacent channel interference is sufficiently stronger than the desired signal (channel 6), then the majority of the range of the A/D converter 206 may be occupied by the interference. Consequently, the desired signal may only occupy a small part of the range.

To monitor the current level of a digitized TV signal received at the digital AGC 206, where the received digitized TV signal adheres to the NTSC or PAL standards, the digital AGC 206 may determine a level for the "sync tip", which is peak of a horizontal synchronization pulse. In the video signal, only the sync tip parts (roughly 4.7 micro seconds long for each horizontal line for both NTSC and PAL) are deterministic, while the visible parts (roughly 53 micro seconds) are random. To perform automatic gain control, that is, control the gain of the VGA 205, the deterministic part of the video signal, that is, the sync tip part, may be depended upon.

Where the received digitized TV signal adheres to the SECAM standard, the current level of a digitized TV signal received at the digital AGC 206 may be monitored through an analysis of the signal envelope.

Notably, the signal received at the digital AGC 206 is intended to pass through the digital AGC 206 unchanged by the monitoring.

The digitized TV signal output from the digital AGC 208 is received by the down converter 210, which includes the programmable image rejection filter 404, whose filter coefficients may be optimized for TV channel bandwidths according to different standards. As discussed earlier, the filter coefficients may be selected according to instructions from the controller 220. The down converter 210 mixes the digitized TV signal down such that the video carrier frequency of the digitized TV signal is shifted from the IF down to nearly zero, to facilitate audio/video spectra separation. Once the spectrum of the digitized TV signal is located at a known frequency as established by the down converter 220, it may be considered that the video carrier is at a known frequency. As such, the AV separator 212 may be applied to the down-converted, digitized TV signal.

The AV separator 212, with settings dictated in instructions from the controller 220, extracts a video signal and an audio signal (digital SIF) separately so that the mutual interference between video signal and audio signal is minimized. The digital SIF is sent to the world wide audio demodulator/decoder 214, which may perform audio demodulation and decoding for the appropriate standard, as instructed by the controller 220, to produce desirable digital audio output, for instance, digital audio over an I2S interface, for D/A conversion or for subsequent audio signal processing. As will be familiar to the person skilled in the art, I2S is a digital audio interface used inside equipment to transfer audio between integrated circuits.

Audio standards for TV signals include an audio standard proposed by the Broadcast Television System Committee (BTSC), Frequency Modulated (FM) audio standards, Dual-FM audio standard, Amplitude Modulated (AM) audio standard and the audio standard known as Near Instantaneous Companded Audio Multiplex (NICAM).

Since the video carrier signal is almost perfectly located at 0 MHz after the AV separator 212, the VSB filtering circuit 216 may be applied to the video signal at the output of the AV separator 212 to construct a Dual Side Band (DSB) baseband video signal and generate a digital CVBS. The digital CVBS, whose encoding in either NTSC, PAL or SECAM format is received in an indication from the controller 220, may be processed by the world wide digital video decoder 218 to produce desirable digital video output, for instance, digital video over an interface adhering to the ITU standard ITU.R 656 digital format for D/A conversion or for subsequent video signal processing.

Operation of the down converter 210 may be better understood in view of FIG. 4. The first down converter mixer 402 mixes the received digitized TV signal with a signal supplied by the first down converter frequency source 412. The frequency of the signal supplied by the first down converter frequency source 412 may be determined based on the frequency adjustment signal received from the video carrier recovery circuit 408 and an internal frequency skew. In particular, the internal frequency skew allows the entire spectrum of the received digitized TV signal to fit within the passband of the frequency response of the programmable image rejection filter 404. The internal frequency skew is, therefore, dependent upon the bandwidth of the channel and the IF associated with the variant of TV standard to be used. The output of the first down converter mixer 402 is filtered by the programmable image rejection filter 404, whose frequency response is determined by filter coefficients selected according to instructions from the controller 220 to correspond to a particular TV standard variant. The programmable image rejection filter 404 is preferably a brick wall-like filter for removing digital images and adjacent channel interference.

Optionally, before being output from the programmable image rejection filter 404, the filtered digitized TV signal may be re-sampled by a re-sampler 416 at a reduced sampling frequency, $f_{sr}$, that is half the sampling frequency used by the A/D converter 206. In an exemplary case, 27.25 MHz is selected as the sampling frequency to sample the IF TV signal produced by the tuner 202 without aliasing. However, it may be considered that using the number of samples generated by a 27.25 MHz sampling frequency throughout the whole TV signal reception system 200 is wasteful of resources. Since the analog video signal has a maximum bandwidth of 6 MHz for TV signals formatted according to the TV standards considered herein, a reduced sampling frequency that is half of the 27.25 exemplary sampling frequency (13.625 MHz) is sufficient to preserve the bandwidth of the TV signal. The point subsequent to filtering by the programmable image rejection filter 404 is selected since, by that point, it is expected that out of band noise has been filtered out and that such a re-sampling will not cause any aliasing.

Advantageously, the reduced sampling frequency provides a reduction to the amount of computation required by subsequent components. In the case of some components, the consequence of the reduced sampling frequency is a reduction in a gate count, where the components are Application Specific Integrated Circuits (ASICs). By reducing the gate count of an ASIC, the cost is correspondingly reduced.

The re-sampled, filtered digitized TV signal output from the programmable image rejection filter 404 is mixed with a signal from the second down converter frequency source 414 by the second down converter mixer 406. The frequency of the signal supplied by the second down converter frequency source 414 is determined based on the internal frequency skew. Essentially, the internal frequency skew that was introduced at the first down converter mixer 402 is removed at the second down converter mixer 406.

Figure 5:
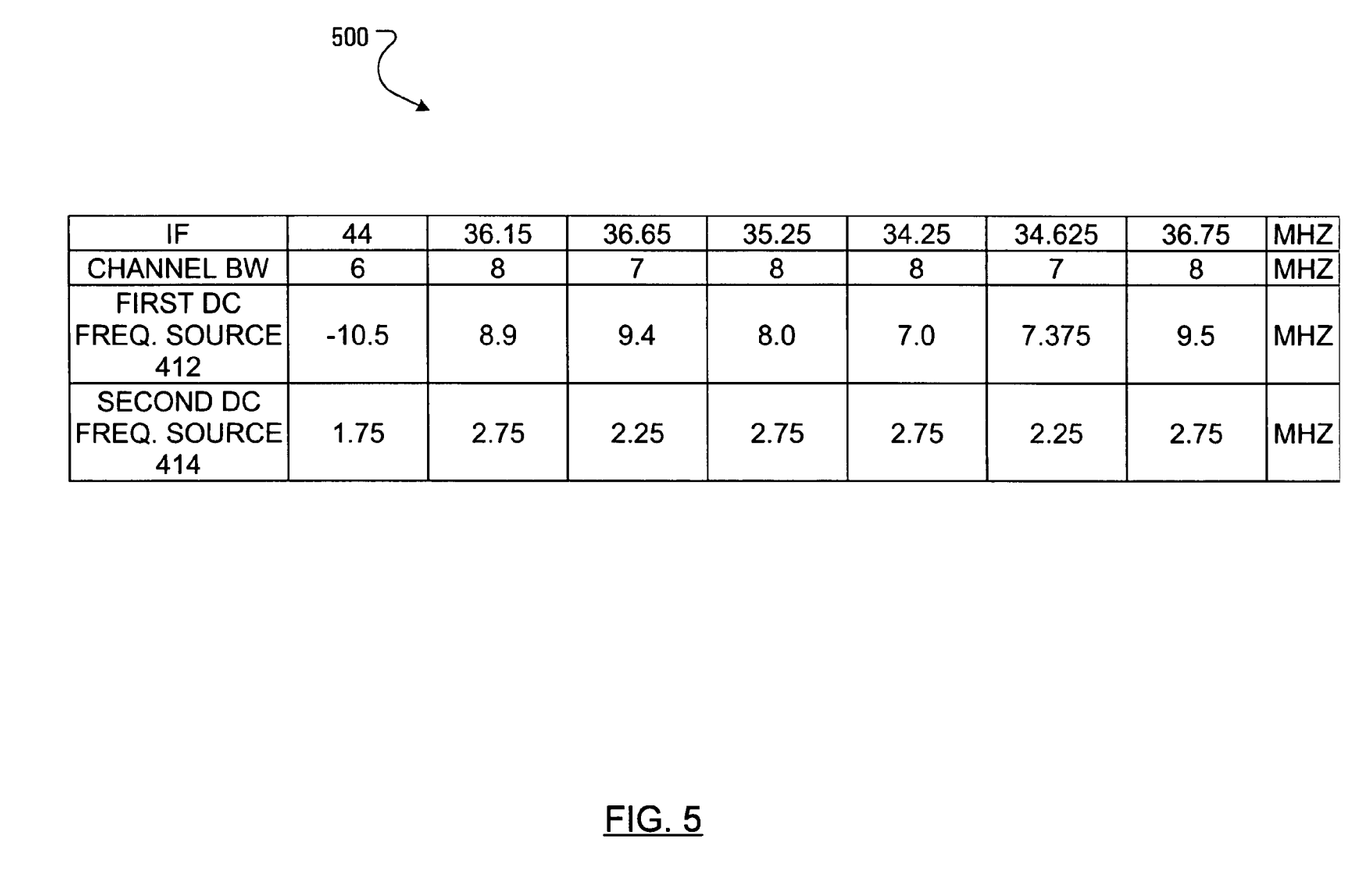
FIG. 5 illustrates a table providing mixing frequencies for use in the down converter of FIG. 4.

A table 500 in FIG. 5 summarizes the frequencies to be selected for the first down converter frequency source 412 and the second down converter frequency source 414, based on the IF and the channel bandwidth of the selected TV standard, which may be indicated by the controller 220.

As the down converter 210 can only shift the received digitized TV signal to near-baseband, there is expected to be remaining frequency offset due to tuning error and well-known phase noise at the tuner 202. The video carrier recovery circuit 408 may be used, in an initial (acquisition) mode, to detect an extent to which the video carrier of the digitized TV signal at the output of the second down converter mixer 406 is offset from 0 MHz. The video carrier recovery circuit 408 may also be used, in a subsequent (tracking) mode, to track a residual (usually small) frequency error, which is primarily due to phase noise at the tuner 202. The video carrier recovery circuit 408 attempts to precisely position the video carrier at 0 MHz prior to the video/audio separation operation at the AV separator 212.

In the acquisition mode, the video carrier recovery circuit 408 determines an initial amount of frequency offset (from baseband) in the video carrier of the digitized TV signal received from the second down converter mixer 406 by detecting a video carrier signal within the demodulated channel. Notably, where the first down converter frequency source 412 may be configured to provide an initial frequency shift of the order of megahertz (see the table 500 of FIG. 5), the video carrier recovery circuit 408 may transmit, to the first down converter frequency source 412, an indication of a frequency adjustment of the order of hundreds of kilohertz.

When the spectrum of the output digital TV signal is properly positioned, the video carrier may be perceived only as a DC level, rather than a sinusoid having a frequency. Residual frequency offset, if any, is often primarily due to phase noise at the tuner 202. The output of the video carrier recovery circuit 408 in the tracking mode is the digitized TV signal with both the initial amount of frequency offset removed and the residual amount of frequency offset significantly reduced. To reduce the residual amount of frequency offset, the video carrier recovery circuit 408 acts to produce a phase adjustment signal that is used, at the third down converter mixer 410 to adjust the phase of the signal output from the second down converter mixer 406 in accordance with a difference between the phase of the video carrier and a reference phase. It is known that the output of a phase locked loop, to which, as discussed earlier, the video carrier recovery circuit 408 may be considered analogous, will always have some phase jitter. As should be clear to a person skilled in the art, the extent of the phase jitter in the output digital TV signal from the down converter 210 is directly related to the amount of bandwidth for which the loop filter 610 (see FIG. 6) is configured.

More detailed operation of the video carrier recovery circuit 408 may be considered in view of the exemplary structure illustrated in FIG. 6. The low pass filter 604 removes high frequency components of the signal received at the input port 602. The output of the low pass filter 604 is passed to the phase error detector 608 via the video carrier recovery mixer 606. If the video carrier of the digitized TV signal is properly positioned at 0 MHz, the output of the low pass filter 604 is only real valued. The phase error detector 608 compares the phase of the output of the video carrier recovery mixer 606 to a reference phase (i.e., zero) to generate a detected phase error. If the video carrier of the digitized TV signal is not properly positioned at 0 MHz, the output of the low pass filter 604 is complex valued, and therefore has a non-zero phase. A signal representative of the detected phase error is passed by the phase error detector 608 to the loop filter 610. The loop filter 610 processes the signal representative of the detected phase error and, along with smoothing any sudden changes in the signal representative of the detected phase error, determines a magnitude of a phase adjustment, to counteract the phase error.

Such phase error control, during which a phase error of small magnitude is corrected by sending a phase adjustment signal, to the third down converter mixer 410 and the video carrier recovery mixer 606, may be seen, over time, to constitute fine frequency error control.

For gross frequency error control, an ongoing phase error of large magnitude (representative of a large frequency offset) is corrected by sending a frequency adjustment signal, determined as the rate of change of the phase adjustment, to the first down converter frequency source 412 as a value representative of the large frequency offset.

While the acquisition mode may be seen to be concerned with the reduction of large scale frequency offset (hundreds of KHz) before filtering by the programmable image rejection filter 404, the tracking mode may be seen to be concerned with the reduction of phase error at the output of the down converter 210, which has the consequence of reducing small scale frequency error.

The loop filter 610 may determine that it is time to switch from the acquisition mode to the tracking mode, wherein the phase adjustment signal is sent to the video carrier recovery output port 612 and the video carrier recovery mixer 606, when the magnitude of the frequency offset being sent by the loop filter 610 to the first down converter frequency source 412 is smaller than a pre-defined threshold. Alternatively, the loop filter 610 may switch from the acquisition mode to the tracking mode after a pre-defined time of operation, say, 10 ms after power up.

The acquisition mode, wherein frequency offset detection by the video carrier recovery circuit 408 and compensation by the first down converter frequency source 412 is required, may be returned to periodically for situations wherein the digitized TV signal frequency drifts, for example, due to poor performance of the tuner 202.

A frequency-offset reduced digitized TV signal may then be passed from the down converter 210 to the AV separator 212. Advantageously, the AV separator 212, whose structure has been discussed hereinbefore, may be configured to provide appropriate audio/video separation in addition to a linear phase transfer characteristic so that subsequent Vestigial Sideband filtering (at the VSB filtering circuit 216) and audio demodulation (at the world wide audio demodulator/decoder 214) can be carried out on the resultant digitized video output signal and digitized audio output signal (digital SIF signal), respectively, without mutual interference.

The proposed AV separator 212 illustrated in FIG. 7 uses the complementary filter 704 to separate the audio signal from the video signal while, preferably, maintaining a flat frequency response and eliminating cross-talk between the audio signal and the video signal. For instance, the (half-band) low pass filter 904 may be used to extract the video signal. As the frequency response of the low pass filter 904 may be considered to have a passband region from $-f_{sr}/4$ to $f_{sr}/4$, a signal from the first AV separator frequency source 712 is mixed at the first AV separation mixer 702 with the digitized TV signal received at the AV separator 212 so that the audio signal spectrum falls completely outside the passband region while the video signal is positioned within the passband region without distortion. At the second AV separation mixer 706, a signal from the second AV separator frequency source 714 is mixed with the output of the complementary filter 704 to restore the video carrier back to 0 MHz.

In an alternative embodiment, rather than a complementary filter arrangement, the audio signal may be extracted by subtracting the video signal output from the low pass filter 904 from the signal received at the complementary filter input port/splitter 902.

Figure 8:
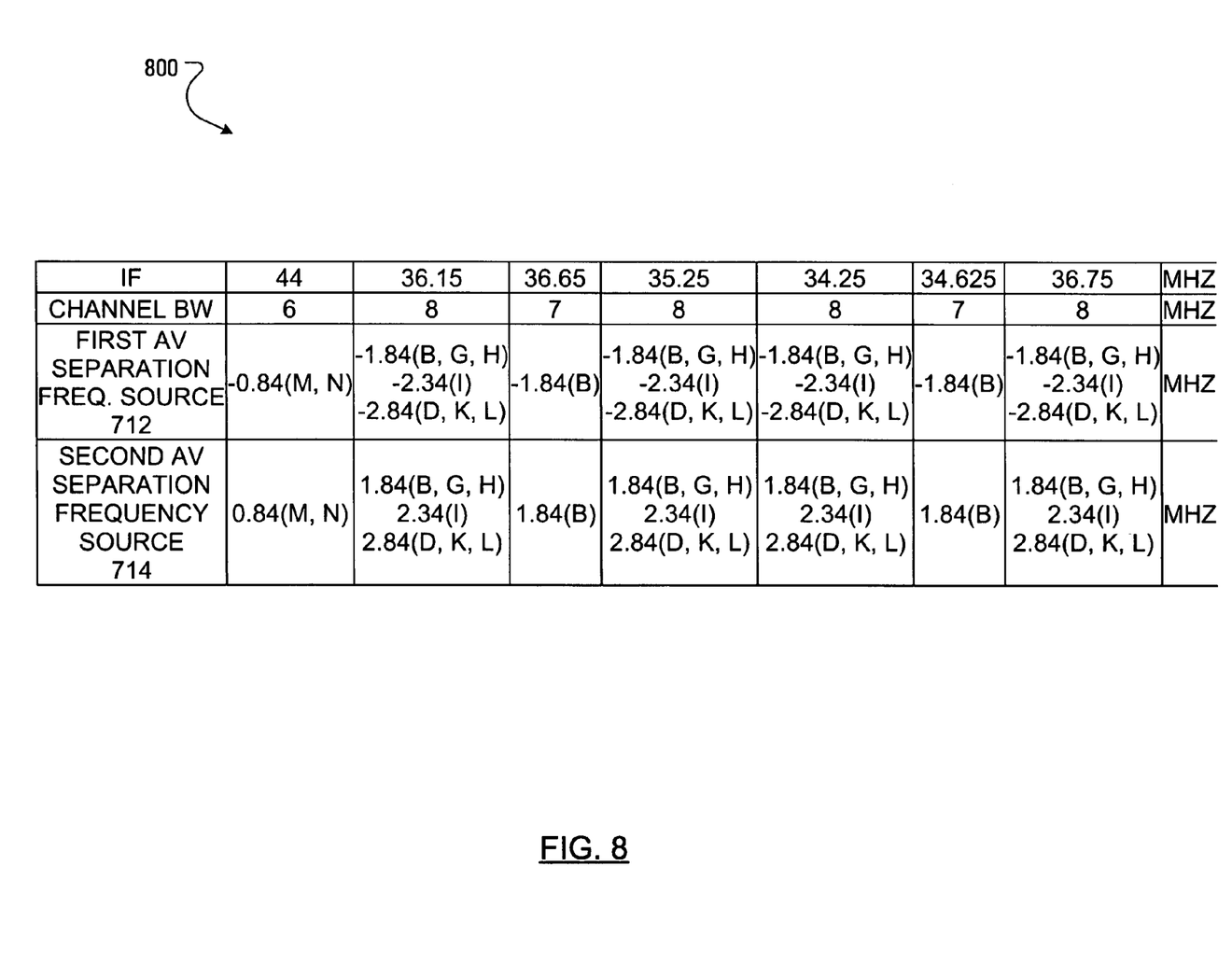
FIG. 8 illustrates a table providing mixing frequencies for use in the audio/video separator of FIG. 7.

The table 800 of FIG. 8 summarizes the frequencies to be supplied by the first AV separator frequency source 712 and the second AV separator frequency source 714 for different TV standard variants.

In the AV separator 212, configured as proposed in FIG. 7, the audio signal does not go through the second AV separator mixer 706. Such a configuration is based on an assumption that the world wide audio demodulator/decoder 214, or other element down-stream in the audio signal path, will incorporate a mixer for proper down-conversion. With the proposed architecture for the AV separator 212, a wide variety of analog TV standards with different channel bandwidths can be accommodated by appropriate programming (selection of frequencies) of the first AV separator frequency source 712 and the second AV separator frequency source 714.

All of the analog TV transmission standards referenced herein employ VSB modulation to reduce occupied radio frequency spectrum. For all TV standards referenced herein, except for PAL H/I and SECAM K1/L, the region from −0.75 MHz to 0.75 MHz may be considered to use double side band modulation while the region from −1.25 MHz to −0.75 Mhz may be considered a "transition band". The transition band may be categorized as a "do not care" region. As part of the VSB filtering circuit 216, the VSB shaping filter 1002 is used to recover the entire double side band video signal frequency spectrum represented by the received VSB spectrum. The complex output of the VSB shaping filter 1002 is passed to the group delay compensation filter 1003. The real part of the complex output of the VSB shaping filter 1002 may be equalized, according to configuration by the controller 220, by the group delay compensation filter 1003 to produce a signal with a group delay that is normally present in a television signal at the output of an analog demodulator. At the output of the group delay compensation filter 1003, a complex video signal is passed to the real component selector 1004, which takes the real part of the complex video signal to construct a digital composite video baseband signal (CVBS).

As discussed earlier, The digital CVBS (encoded in either NTSC, PAL or SECAM format) may be processed by the world wide digital video decoder 218 to produce desirable digital video output, for instance, digital video over an interface adhering to the ITU standard ITU-656 digital format for D/A conversion or for subsequent video signal processing.

By way of example, consider that the TV signal reception system 200 of FIG. 2 is configured by the controller 220 to receive an analog TV signal according to the NTSC standard. In particular, the tuner 202 is configured for a 6 MHz channel bandwidth and to provide an output TV signal at an IF of 44 MHz.

For the purposes of this example, the user may select to use a SAW filter with an 8 MHz wide passband for the SAW filter 204. Due to the selection of the particular SAW filter 204, the crystal oscillator 207 may be selected to provide a 27.25 sampling frequency, $f_s$, to the A/D converter 206 (see the table 300B of FIG. 3B).

The filtered digitized TV signal may then be amplified by the VGA 205 according to feedback from the digital AGC 208.

When the TV signal at an IF of 44 MHz is sampled by the A/D converter 206 in bandpass sampling mode at a sampling frequency of 27.25 MHz, one resulting signal is a digitized TV signal centered at 10.5 MHz.

At the down converter 210, the filtered, amplified and digitized TV signal centered at 10.5 MHz is mixed down at the first down converter mixer 402 by 10.5 MHz, selected according to indications from the controller 220 (see the table 500 of FIG. 5), through mixing with a signal received from the first down converter frequency source 412. The mixed-down, digitized TV signal is then filtered by the programmable image rejection filter 404 with filter coefficients selected according to indications from the controller 220, giving the programmable image rejection filter 404 a bandwidth of 6 MHz.

Once the digital images and adjacent channel interference has been removed from the digitized TV signal by the programmable image rejection filter 404, the digitized TV signal is mixed up at the second down converter mixer 406 by 1.75 MHz, selected according to indications from the controller 220 (see the table 500 of FIG. 5), through mixing with a signal received from the second down converter frequency source 414 (since the video carrier is positioned 1.75 MHz below the center of the 6 MHz channel according to the NTSC standard).

For this example, we consider briefly the case wherein a frequency offset is introduced in the received TV signal due to, for instance, a mis-tuning of the tuner 202. In such a case, the output of the down converter mixer 406 will have a video carrier that is offset from 0 MHz. The video carrier recovery circuit 408 detects the video carrier offset and introduces a phase adjustment signal to the third down converter mixer 410 to mix the input to the third down converter mixer 406 down, such that the output of the down converter 210 may be assumed to have a video carrier positioned at 0 MHz.

The video carrier recovery circuit 408 will detect this frequency offset and correct it by mixer 410. The re-sampler 416 then re-samples the digitized TV signal at 13.625 MHz.

At the AV separator 212, the re-sampled, digitized TV signal is mixed down at the AV separator mixer 702 by 0.84 MHz, selected according to indications from the controller 220 (see the table 800 of FIG. 8), through mixing with a signal received from the first AV separator frequency source 712. The audio carrier, which is positioned 2.75 MHz above the center of the 6 MHz channel according to the NTSC standard and positioned at 4.5 MHz at the output of the down converter, is thus moved by the AV separator mixer 702 to 3.66 MHz.

Given a reduced sampling frequency, $f_{sr}$, of 13.625 MHz, the frequency response of the low pass filter 904 may be configured to have a passband region from −3.41 MHz to 3.41 MHz ($-f_{sr}/4$ to $f_{sr}/4$). As such, the audio carrier at 3.66 MHz (and the rest of the audio spectrum) is positioned outside of the passband region of the low pass filter 904. Correspondingly, the audio carrier at 3.66 MHz (and the rest of the audio spectrum) is positioned within the passband region of the high pass filter 908, which is complementary to the low pass filter 904. The high pass filter 908 then passes the audio signal (digital SIF) to the world wide audio demodulator/decoder 214 via the audio output port 910. At the same time, the low pass filter 904 outputs the video signal, which is mixed up by the second AV separator mixer 706 by 0.84 MHz, selected according to indications from the controller 220 (see the table 800 of FIG. 8), through mixing with a signal received from the second AV separator frequency source 714. The mixing of the video signal returns the video carrier back to around 0 MHz. The video signal is then passed to the VSB filtering circuit 216.

At the VSB filtering circuit 216, an indication of the NTSC standard from the controller 220 allows the VSB filter 1002 to be configured to anticipate a double sideband region in the range from −0.75 MHz to 0.75 MHz.

The real component of the complex output of the VSB filter 1002, whose group delay has been adjusted by the group delay compensation filter 1003, is then selected by the real component selector 1004 and passed to the world wide digital video decoder 218.

Advantageously, the configurability of the adjustable components of the TV signal reception system 200 allows for enough flexibility to receive analog TV signals adhering to a wide variety of variants of standards.

Other modifications will be apparent to those skilled in the art and, therefore, the invention is defined in the claims.

We claim:

1. A television signal reception system comprising:
  an analog to digital converter for:
    receiving an intermediate frequency television signal; and
    sampling said intermediate frequency television signal at a predetermined sampling frequency to produce a digitized television signal with a center frequency having an expected frequency offset from baseband, where said expected frequency offset is dependent upon a variant of a television standard according to which said intermediate frequency television signal is formatted;
  a controller for providing an indication of said variant of said television standard for said intermediate frequency television signal;
  a down converter including:
    a first down converter frequency source for:
      receiving said indication of said variant of said television standard from said controller;
      selecting a frequency for a first mixing signal based on said indication of said variant of said television standard, where said frequency for said first mixing signal incorporates said expected frequency offset; and
    a first down converter mixer for:
      receiving said digitized television signal;
      receiving said first mixing signal;
      mixing down said digitized television signal with said first mixing signal to produce a mixed-down, digitized television signal with a center frequency near baseband; and
    an image rejection filter for:
      receiving said mixed-down, digitized television signal;
      receiving said indication of said variant of said television standard;

selecting filter coefficients based on said indication of said variant of said television standard; and
filtering said mixed-down, digitized television signal according to said filter coefficients to produce a filtered digitized television signal;
a second down converter frequency source for:
receiving said indication of said variant of said television standard from said controller;
selecting a frequency for a second mixing signal based on said indication of said variant of said television standard; and
a second down converter mixer for:
receiving said filtered digitized television signal;
receiving said second mixing signal;
mixing said filtered digitized television signal with said second mixing signal to produce a mixed-up, digitized television signal with a video carrier frequency near baseband.

2. The television signal reception system of claim 1 further comprising a low pass video separation filter for filtering said mixed-up, digitized television signal to produce a digital video signal.

3. The television signal reception system of claim 1 wherein said low pass video separation filter is a finite impulse response digital filter.

4. The television signal reception system of claim 1 further comprising a high pass audio separation filter for filtering said mixed-up, digitized television signal to produce a digital audio signal.

5. The television signal reception system of claim 3 wherein said high pass audio separation filter is a finite impulse response digital filter.

6. The television signal reception system of claim 3 wherein a cut-off frequency for said low pass video separation filter is based on said predetermined sampling frequency.

7. The television signal reception system of claim 5 wherein a cut-off frequency for said high pass audio separation filter is equivalent to said cut-off frequency for said low pass video separation filter.

8. The television signal reception system of claim 6 further comprising:
a first separation filter frequency source for:
receiving said indication of said variant of said television standard; and
selecting a frequency for a first separation filter mixing signal based on said indication of said variant of said television standard; and
a first separation filter mixer for:
receiving said mixed-up, digitized television signal;
receiving said first separation filter mixing signal; and
mixing said mixed-up, digitized television signal with said first separation filter mixing signal to produce a digitized television signal with an audio signal having a frequency range with a minimum frequency, where said minimum frequency is greater than said cut-off frequency for said low pass video separation filter.

9. The television signal reception system of claim 7 further comprising:
a second separation filter frequency source for:
receiving said indication of said variant of said television standard; and
selecting a frequency for a second separation filter mixing signal based on said indication of said variant of said television standard; and
a second separation filter mixer for:
mixing said digital video signal with said second separation filter mixing signal to produce a digital video signal with said video carrier signal positioned within 50 Hz of baseband.

10. The television signal reception system of claim 4 further comprising:
a vestigial sideband filter for filtering said digital video signal with said video carrier signal near baseband to produce a complex digital video signal; and
a real component selector for selecting a real component of said complex digital video signal to produce a composite baseband video signal.

11. The television signal reception system of claim 1 further comprising a re-sampler for re-sampling said mixed-up, digitized television signal to produce a re-sampled, mixed-up, digitized television signal.

12. The television signal reception system of claim 1 further comprising:
a video carrier recovery circuit for:
receiving said mixed-up, digitized television signal;
detecting a phase offset of said video carrier;
generating a phase adjustment signal based on said phase offset;
a third down converter mixer for:
receiving said mixed-up, digitized television signal;
receiving said phase adjustment signal;
mixing said mixed-up, digitized television signal with said phase adjustment signal to produce a mixed-up, digitized television signal with a video carrier frequency nearer to baseband.

13. The television signal reception system of claim 12 wherein said video carrier recovery circuit is further for generating a frequency adjustment signal based on said phase offset.

14. The television signal reception system of claim 12 wherein said selecting said frequency for said first mixing signal is also based on said frequency adjustment signal.

15. A television signal reception method comprising:
sampling a received intermediate frequency television signal at a predetermined sampling frequency to produce a digitized television signal with a center frequency having an expected frequency offset from baseband, where said expected frequency offset is dependent upon a variant of a television standard of said received intermediate frequency television signal;
receiving an indication of said variant of said television standard;
selecting a frequency for a first mixing signal based on said indication of said variant of said television standard, where said frequency for said first mixing signal incorporates said expected frequency offset;
mixing down said digitized television signal with said first mixing signal to produce a mixed-down, digitized television signal with a center frequency near baseband;
selecting filter coefficients based on said indication of said variant of said television standard;
filtering said mixed-down, digitized television signal according to said filter coefficients to produce a filtered digitized television signal; and
processing said filtered digitized television signal to demodulate and decode said television signal.

16. A television signal reception system comprising:
an analog to digital converter for:
receiving an intermediate frequency television signal; and
sampling said intermediate frequency television signal at a predetermined sampling frequency to produce a digitized television signal with a center frequency having an expected frequency offset from baseband, where said expected frequency offset is dependent upon a variant of a television standard according to which said intermediate frequency television signal is formatted;

a controller for providing an indication of said variant of said television standard for said intermediate frequency television signal;

a frequency source for:
   receiving said indication of said variant of said television standard; and
   selecting a frequency for a mixing signal based on said indication of said variant of said television standard; and a mixer for:
   receiving said digitized television signal;
   receiving said mixing signal; and
   mixing said digitized television signal with said mixing signal to produce a mixed digitized television signal with an audio signal having a frequency range with a minimum frequency, where said minimum frequency is greater than a predetermined border frequency based on said predetermined sampling frequency; and a low pass video separation filter for filtering said mixed digitized television signal to produce a digital video signal, wherein a cut-off frequency for said low pass video separation filter is equivalent to said predetermined border frequency.

17. The television signal reception system of claim 16 further comprising a high pass audio separation filter for filtering said digitized television signal to produce a digital audio signal.

18. The television signal reception system of claim 16 wherein a cut-off frequency for said high pass audio separation filter is equivalent to said cut-off frequency for said low pass video separation filter.

19. The method of claim 15, wherein said processing further comprises further mixing said filtered digitized video signal to produce a baseband digitized television signal and decoding and demodulating said baseband digital television signal.

20. The method of claim 19, wherein said processing further comprising separating said baseband digital television signal into digital audio and digital video signals.

* * * * *